(12) United States Patent
Lee

(10) Patent No.: US 7,834,505 B2
(45) Date of Patent: Nov. 16, 2010

(54) ROTARY DEVICE OF GENERATOR OR MOTOR

(75) Inventor: Sun-Hyu Lee, Sunchon (KR)

(73) Assignee: Sun Tech Generator Co., Ltd., Sunchon, Chonnam (KR)

( * ) Notice: Subject to any disclaimer, the term of this patent is extended or adjusted under 35 U.S.C. 154(b) by 219 days.

(21) Appl. No.: 11/740,876

(22) Filed: Apr. 26, 2007

(65) Prior Publication Data

US 2007/0252470 A1    Nov. 1, 2007

(30) Foreign Application Priority Data

Apr. 27, 2006  (KR) .................. 20-2006-0011336 U
Sep. 29, 2006  (KR) ..................... 10-2006-0095796

(51) Int. Cl.
*H02K 21/12* (2006.01)
*H02K 1/00* (2006.01)

(52) U.S. Cl. ............................ 310/156.53; 310/156.56; 310/156.57; 310/261.1

(58) Field of Classification Search ................. 310/259, 310/261.1, 156.53, 156.56, 156.57; H02K 1/00, H02K 21/12
See application file for complete search history.

(56) References Cited

U.S. PATENT DOCUMENTS

| | | | | |
|---|---|---|---|---|
| 4,795,936 A | * | 1/1989 | Crosetto et al. | 310/156.53 |
| 5,672,926 A | * | 9/1997 | Brandes et al. | 310/181 |
| 6,025,667 A | * | 2/2000 | Narita et al. | 310/156.53 |
| 6,472,780 B2 | * | 10/2002 | Kikuchi et al. | 310/52 |
| 6,552,462 B2 | * | 4/2003 | Sakai et al. | 310/156.78 |
| 6,847,143 B1 | * | 1/2005 | Akemakou | 310/156.43 |
| 7,105,971 B2 | * | 9/2006 | Asai et al. | 310/156.53 |
| 7,560,842 B2 | * | 7/2009 | Hattori | 310/156.53 |
| 2004/0007930 A1 | * | 1/2004 | Asai et al. | 310/156.53 |
| 2006/0103254 A1 | * | 5/2006 | Horst | 310/156.53 |
| 2007/0290566 A1 | * | 12/2007 | Mizutani et al. | 310/156.56 |

FOREIGN PATENT DOCUMENTS

| | | |
|---|---|---|
| JP | 2001-314051 | 11/2001 |
| KR | 20-1999-0027928 | 12/1999 |
| KR | 100597191 | 6/2006 |

* cited by examiner

*Primary Examiner*—Quyen Leung
*Assistant Examiner*—Terrance Kenerly
(74) *Attorney, Agent, or Firm*—IPLA P.A.; James E. Bame

(57) ABSTRACT

Disclosed is a rotary device of a generator or motor which includes: a stator having a hollow portion formed at the inside thereof and a plurality of slots formed to wind coils therearound, each of the plurality of slots being skewed at a predetermined angle; a rotor shaft formed of a nonmagnetic material; a cylindrical rotor body adapted to axially rotate together with the rotor shaft; a plurality of N-polar and S-polar permanent magnet groups insertedly coupled radially along the outside of the center portion of the rotor body in an alternating arrangement; a plurality of magnetic flux-increasing magnets insertedly coupled along the inside of the rotor body and arranged on the lines of magnetic force formed by the N-polar and S-polar permanent magnet groups, for increasing magnetic flux; and a rotor adapted to be rotatably inserted into the hollow portion of the stator.

5 Claims, 7 Drawing Sheets

220

ROTARY DEVICE OF GENERATOR OR MOTOR

CROSS REFERENCE

Applicant claims foreign priority under Paris Convention and 35 U.S.C. §119 to Korean Patent Application No. 20-2006-0011336, filed Apr. 27, 2006, and to Korean Patent Application No. 10-2006-0095796, filed Sep. 29, 2006 each with the Korean Intellectual Property Office.

BACKGROUND OF THE INVENTION

1. Field of the Invention

The present invention relates to a rotary device of a generator or motor.

2. Background of the Related Art

As one prior art, there is proposed Korean Patent Registration No. 597191 entitled 'rotor of generator and motor' as filed by the same applicant as this invention wherein the rotor is provided with a plurality of magnetic flux-increasing magnets for increasing magnetic flux therein, thereby improving the generation efficiency of the generator or motor.

In the prior art, however, the rotor is skewed at a given angle so as to decrease a cogging torque causing vibration and noise in the generator or motor.

In this case, actually, the desired skew is not formed easily because of the attractive force or repulsive force between the upper and lower permanent magnets and the rotation of the rotor, and further, it is not easy to keep the skew designed initially.

Moreover, in the conventional rotary devices wherein the skew is provided to the rotor or the stator, or both of them, it is not easy to keep the skew designed initially, such that there is a problem in that the cogging torque causing noise and vibration cannot be sufficiently decreased only with the skew designed initially.

FIG. 1 is a view showing the lines of magnetic force generated from permanent magnets according to the conventional practice, wherein the lines of magnetic force are generated by a plurality of N-polar and S-polar permanent magnet groups.

As shown in FIG. 1, it can be appreciated that lots of magnetic flux leaks, such that the lines of magnetic force formed on the rotor body do not form a smooth curve and are substantially significantly bent. According to the conventional practice, therefore, there is a problem that the magnetic force is increased, but the cogging torque is not sufficiently decreased, thereby making the generation efficiency deteriorated.

Generally, a generator is a device that generates an electromotive force by electromagnetic induction to convert a mechanical energy into an electrical energy. Most of generators are rotators, and recently, linearly moving generators are developed.

The generator requires magnets producing a magnetic field and a conductor generating an electromotive force, and in this case, any one of the magnets and the conductor should be moved. A generator in which the conductor stops and the magnetic field rotates is a revolving field type, and contrarily, a generator in which the conductor rotates and the magnetic field stops is a revolving armature type.

As another prior art, there has been disclosed Korean Utility Model Registration No. 0182495 wherein a stator is of a ring shape, and when the plurality of stators are cut by means of press processing, there is a problem that the materials formed between the adjacent stators and at the inside of the ring are unnecessarily consumed.

Moreover, since the electric wires are wound around the stator of a generator or a motor, the stator causes electromagnetic induction together with the rotator, and in this case, harmonics may be generated.

SUMMARY OF THE INVENTION

Accordingly, the present invention has been made in view of the above-mentioned problems occurring in the prior art, and it is an object of the present invention to provide a rotary device of a generator or motor that has a plurality of magnets capable of increasing magnetic flux formed at the inside of a rotor body, while providing given screw to a stator to achieve the assembling with a rotor, and that has an additional member capable of reducing cogging torque, such that the loss of magnetic flux can be prevented and the distortion of the lines of magnetic force formed by a plurality of permanent magnets can be prevented, which ensures a high generation efficiency of the generator or motor.

It is another object of the present invention to provide a rotary device of a generator or motor that has a stator having a plurality of unit stator pieces adapted to be assembled to one another, thereby reducing the material costs and suppressing the generation of harmonics.

To accomplish the above objects, according to an aspect of the present invention, there is provided a rotary device of a generator or motor including: a stator having a hollow portion formed at the inside thereof and a plurality of slots formed skewed at a predetermined angle along the inner wall of the hollow portion, for winding coils therearound; a rotor shaft formed of a nonmagnetic material; a cylindrical rotor body adapted to axially rotate together with the rotor shaft; a plurality of N-polar and S-polar permanent magnet groups insertedly coupled radially along the outside of the center portion of the rotor body in an alternating arrangement; a plurality of permanent magnets insertedly coupled along the inside of the rotor body and arranged on the lines of magnetic force formed by the N-polar and S-polar permanent magnet groups, for increasing magnetic flux; and a rotor adapted to be rotatably inserted into the hollow portion of the stator.

Preferably, each of the N-polar and S-polar permanent magnet groups of the rotor body includes a plurality of permanent magnets formed spaced apart from each other by predetermined intervals, and a nonmagnetic rod is insertedly coupled between the permanent magnets of each of the N-polar and S-polar permanent magnet groups.

Preferably, the rotor body has an elongated hole extended toward the center portion of the rotor body from a position between each of the N-polar permanent magnet groups and each of the S-polar permanent magnet groups, for preventing the lines of magnetic force generated by the plurality of N-polar and S-polar permanent magnet groups from being distorted.

Preferably, the rotor body has a nonmagnetic plate disposed at both ends thereof.

Preferably, the stator has a stator body having a plurality of core plates laminated on top of one another, each of the core plates having a rotor-receiving portion formed at the center portion thereof and a plurality of arc-shaped pieces separable from each other.

Preferably, each of the core plates further has a coupling protrusion and a coupling groove formed on the separating front ends thereof.

More preferably, each of the core plates has a plurality of locking projections extended outwardly around the outer periphery thereof.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation of a rotary device of a generator or motor according to the present invention will be given with reference to the attached drawings.

Figure 2:
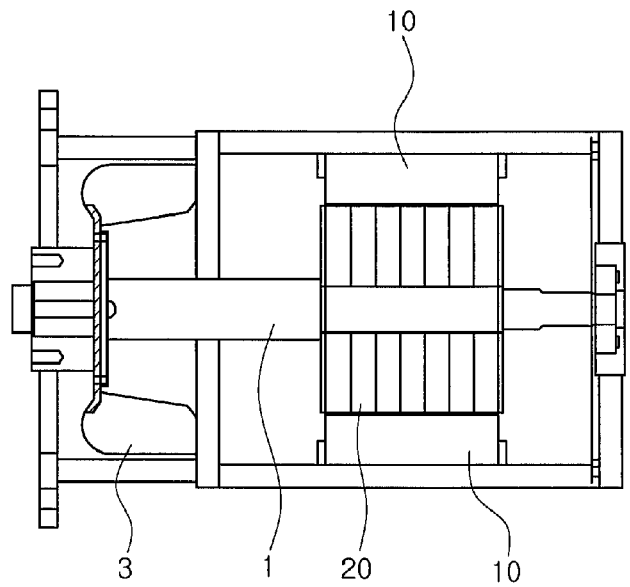
FIG. 2 is a schematic side sectional view showing a rotary device of a generator or a motor according to an embodiment of the present invention.
Figure 3:
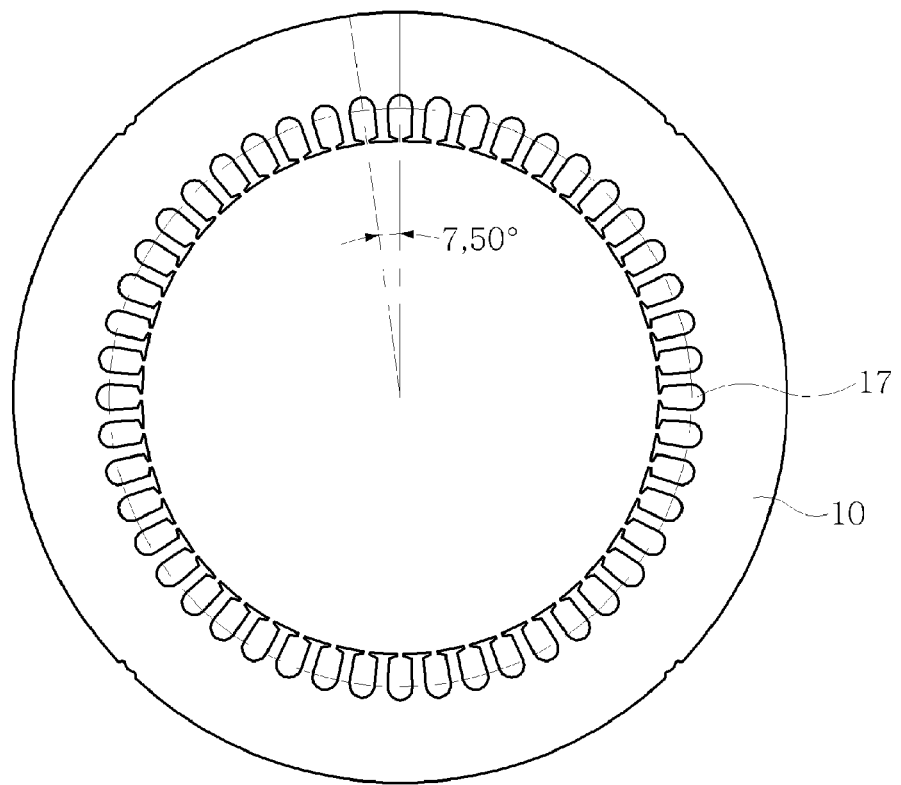
FIG. 3 is a sectional view showing a plurality of slots of a stator of the rotary device of the present invention.
Figure 4:
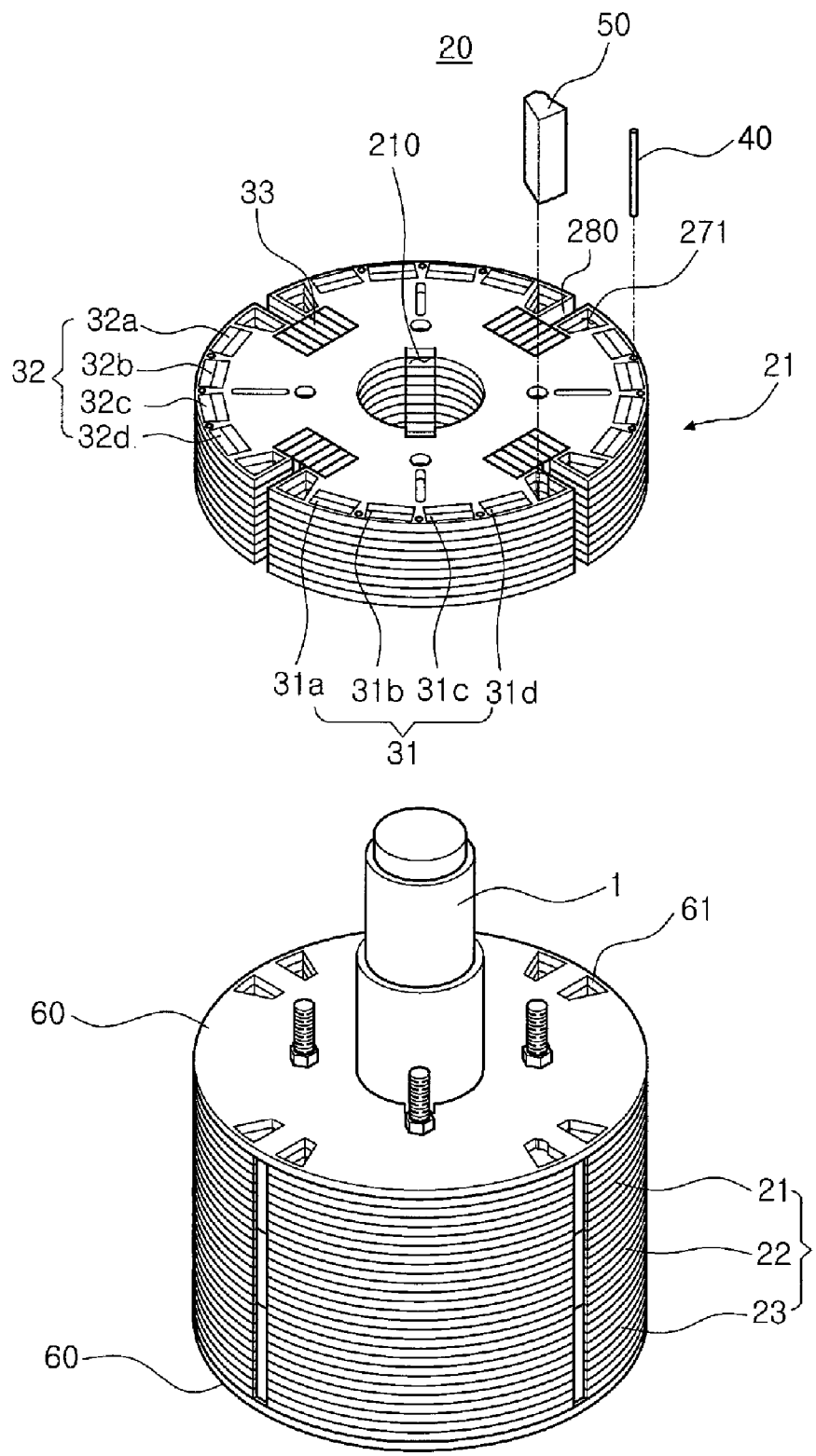
FIG. 4 is a perspective view showing a rotor body having a plurality of unit rotor bodies in the rotary device of the present invention.
Figure 5:
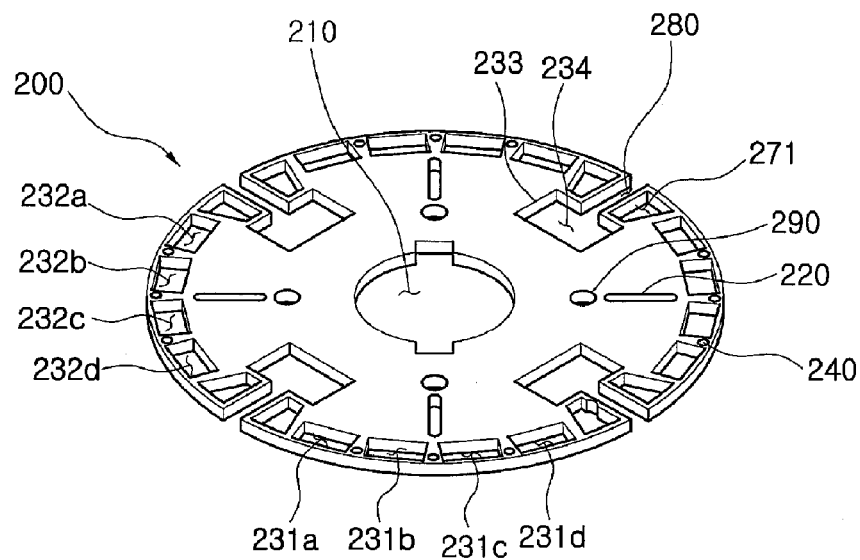
FIG. 5 is a perspective view showing a rotary plate of the rotor in the rotary device of the present invention.
Figure 6:
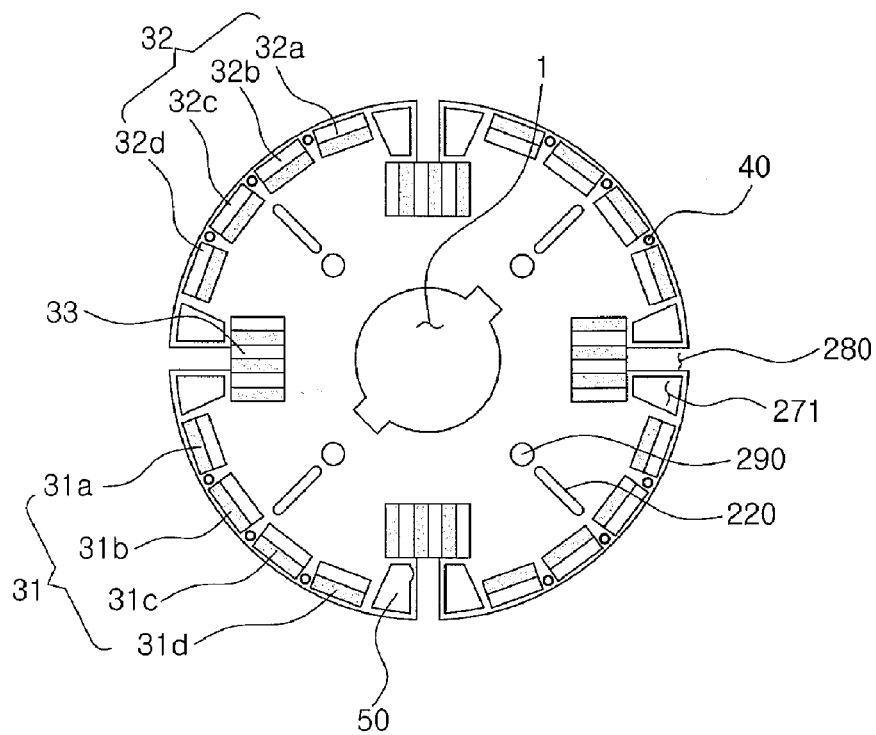
FIG. 6 is a plane view showing the rotor where a nonmagnetic plate is removed in the rotary device of the present invention.
Figure 7:
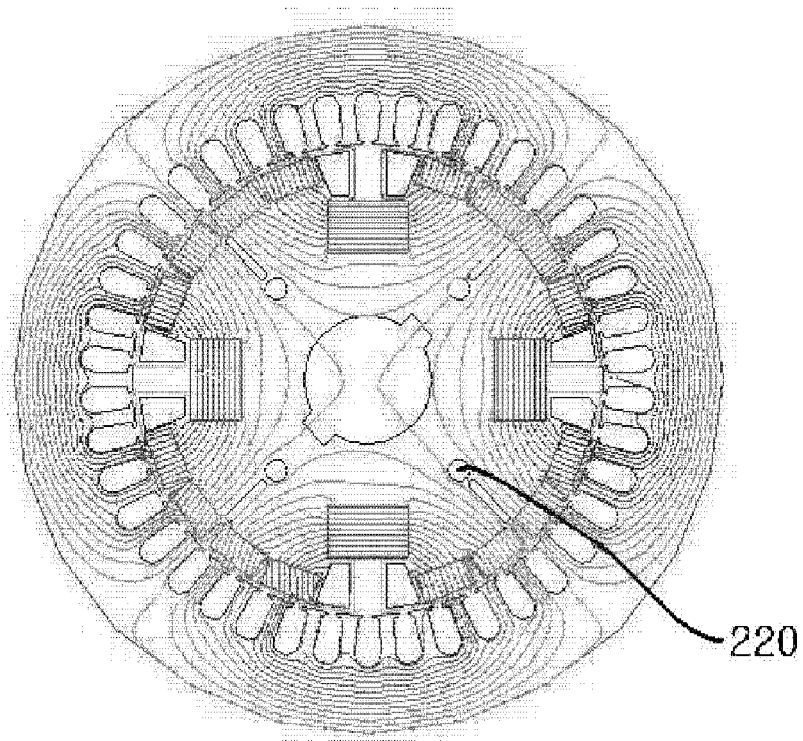
FIG. 7 is a view showing the lines of magnetic force generated from the permanent magnets of the rotor in the rotary device of the present invention.
Figure 8:
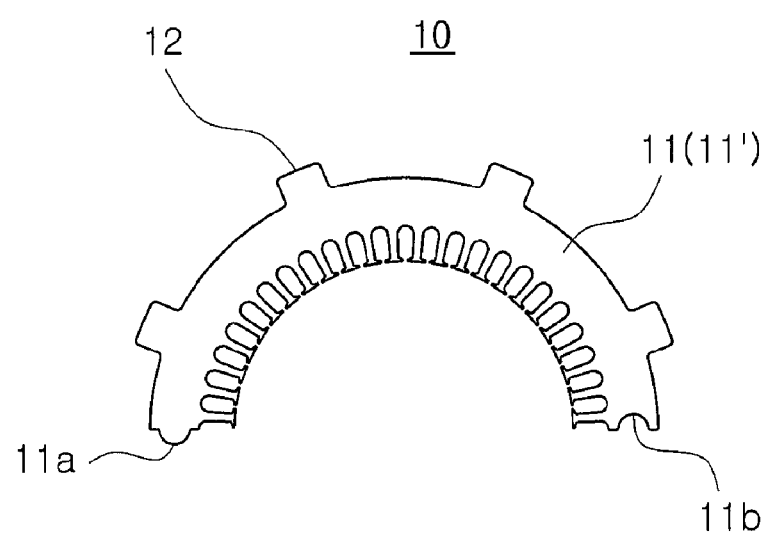
FIG. 8 is a plane view showing one core plate piece of the stator of the rotary device of the present invention.
Figure 9:
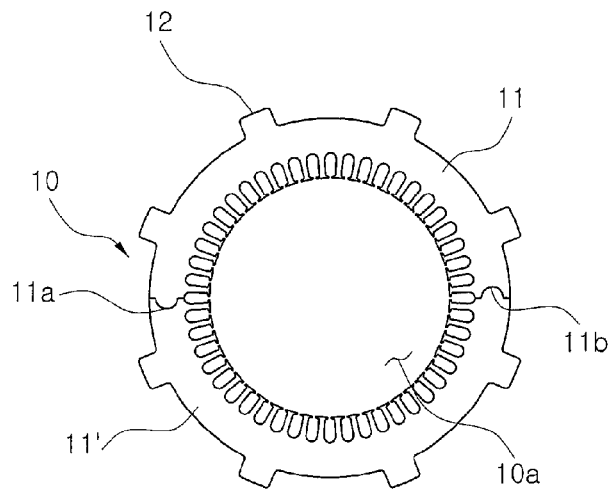
FIG. 9 is a plane view showing the assembled state of the core plate piece of FIG. 8.
Figure 10:
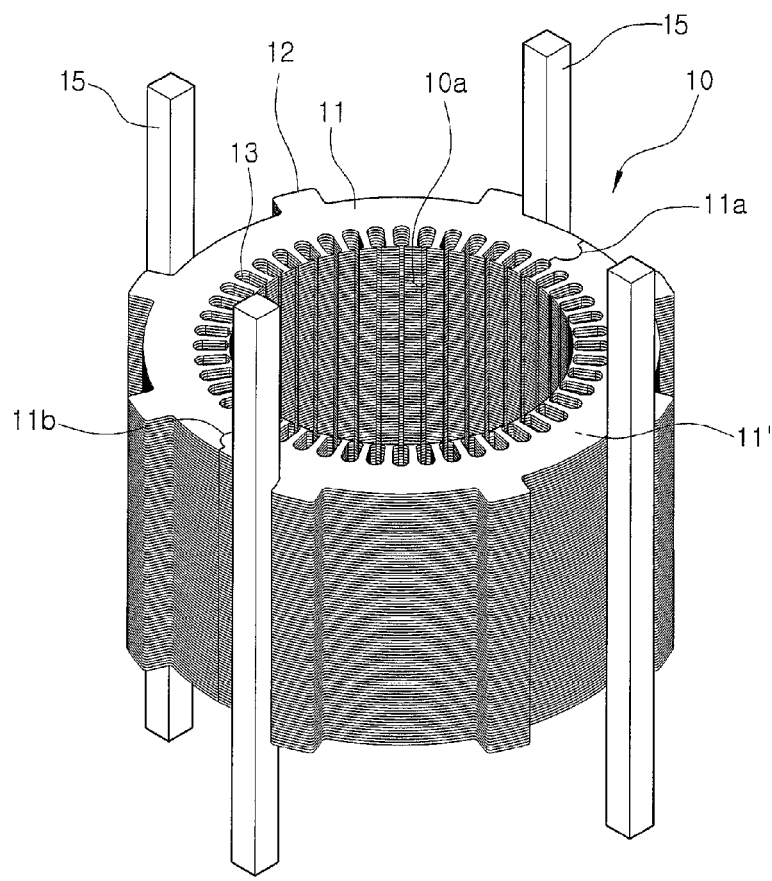
FIG. 10 is a perspective view showing the assembled state of the stator in the rotary device of the present invention.
Figure 11:
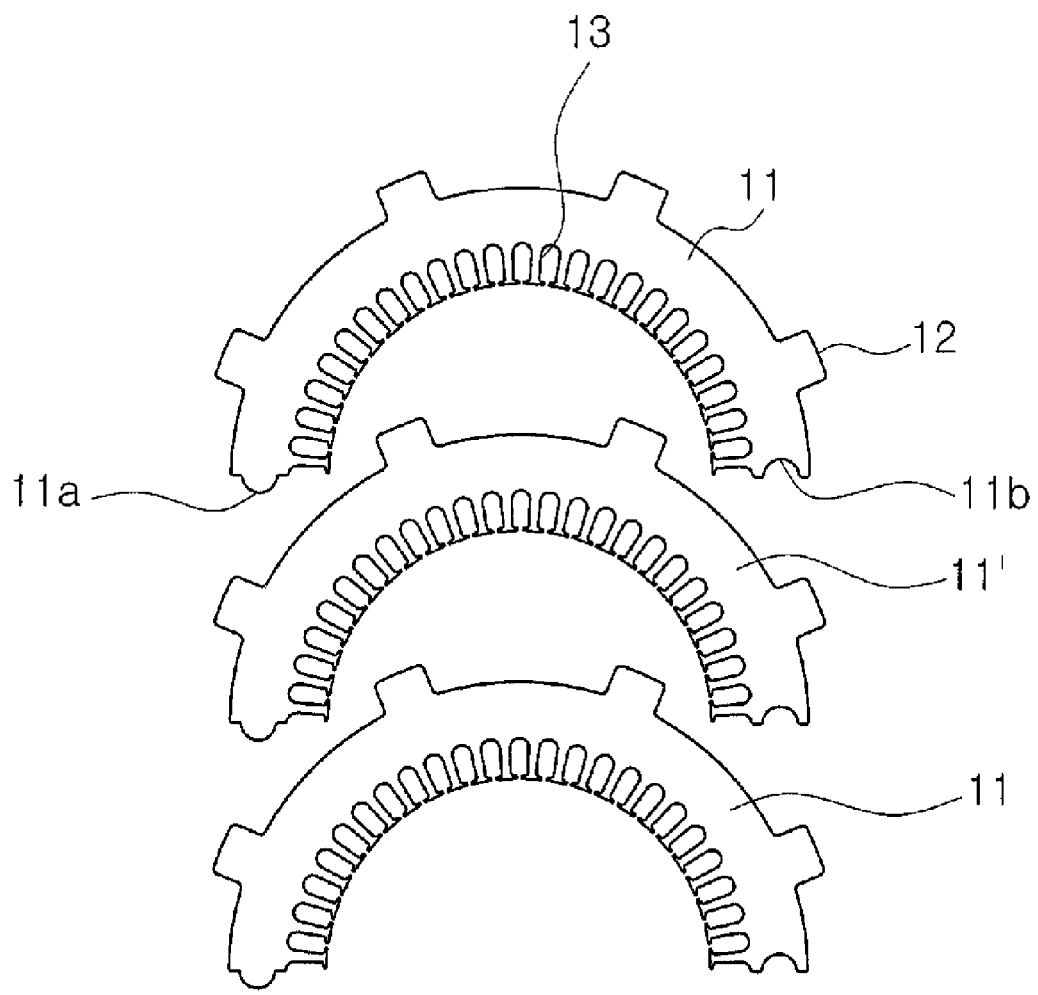
FIG. 11 is a plane view showing the manufacturing state of the core plates of FIG. 9.

FIG. 2 is a schematic side sectional view showing a rotary device of a generator or a motor according to an embodiment of the present invention, FIG. 3 is a sectional view showing a plurality of slots of a stator of the rotary device of the present invention, FIG. 4 is a perspective view showing a rotor body having a plurality of unit rotor bodies in the rotary device of the present invention, FIG. 5 is a perspective view showing a rotary plate of the rotor in the rotary device of the present invention, FIG. 6 is a plane view showing the rotor where a nonmagnetic plate is removed in the rotary device of the present invention, FIG. 7 is a view showing the lines of magnetic force generated from the permanent magnets of the rotor in the rotary device of the present invention, FIG. 8 is a plane view showing one core plate piece of the stator of the rotary device of the present invention, FIG. 9 is a plane view showing the assembled state of the core plate piece of FIG. 8, FIG. 10 is a perspective view showing the assembled state of the stator in the rotary device of the present invention, and FIG. 11 is a plane view showing the manufacturing state of the core plates of FIG. 9.

According to the rotary device of the present invention, as shown in FIG. 2, a stator 10 has a hollow portion adapted to receive a rotor 20 therein and a plurality of slots formed around the inner wall surface forming the hollow portion, the plurality of slots having coils wound therearound.

As shown in FIG. 2, the rotary device of the generator or motor includes the cylindrical stator 10, and the rotor 20 rotatably received in the hollow portion of the stator 10.

The stator 10 has the plurality of slots formed around the wall surface forming the hollow portion at predetermined intervals, and the plurality of slots have the coils wound therearound. The rotor 20 includes a cylindrical rotor body 2, and a rotor shaft 1 insertedly coupled to a shaft-hole formed at the center portion of the rotor body 2 and rotated with the rotor body 2, and further, the rotor body 2 has a plurality of permanent magnets insertedly coupled in the circumferential direction along the outside of the central portion thereof. Further, the rotor shaft 1 is coupled to a cooling fan 3 at its end portion thereof.

Therefore, if current is applied to the coils of the stator 10, the polarities of the coils are sequentially changed, such that if the permanent magnets of the rotor 20 and the coils of the stator 10 have the same polarities as each other, the repulsive forces are generated therebetween, and contrarily, if they have the different polarities from each other, the attractive forces are generated thereto. Thus, the generation of the repulsive forces and the attractive forces causes a centrifugal force, and as a result, as the rotor 20 is rotated together with the rotor shaft 1, the rotation-driving force is generated from the rotary device.

In the rotary device including the stator 10 and the rotor 20, rotation variation like cogging torque occurs. The cogging torque causes vibration or noise during the operation of the rotary device, which makes the control performance of the generator or motor deteriorated.

So as to decrease the cogging torque, the rotor or the stator is skewed at a given angle, such that the harmonics of the frequency waveforms can be removed.

FIG. 3 is a sectional view showing a plurality of slots of a stator of the rotary device of the present invention.

As shown in FIG. 3, a plurality of slots 17 are formed along the inner wall surface of the stator 10 in such a manner as to be skewed in one direction. That is, so as to decrease the cogging torque, the plurality of slots 17 are skewed in such a manner as not to be parallel with the direction of the rotor shaft 1 of the rotor 20, but to be skewed in one direction.

According to the preferred embodiment of the present invention, the skewed angle of each slot 17 is desirably 7.5 degree.

FIG. 4 is a perspective view showing a rotor body having a plurality of unit rotor bodies in the rotary device of the present invention, and FIG. 5 is a perspective view showing a rotary plate of the rotor in the rotary device of the present invention.

As shown in FIGS. 4 and 5, the rotor 20 includes: the rotor shaft 1; the cylindrical rotor body 2 having a plurality of unit rotor bodies 21, 21, and 23 laminated on top of one another along the shaft direction of the rotor shaft 1; a plurality of N-polar and S-polar permanent magnet groups 31 and 32 insertedly coupled radially along the outside of the center portion of the rotor body in an alternating arrangement, each of the N-polar and S-polar permanent magnet groups 31 and 32 having a plurality of permanent magnets 31a to 31d and 32a to 32d; and a plurality of permanent magnets 33 insertedly coupled along the inside of the rotor body 2 and arranged on the lines of magnetic force formed by the N-polar and S-polar permanent magnet groups 31 and 32, for increasing magnetic flux.

The rotor shaft 1 that is insertedly coupled to a shaft hole 210 of the rotor body 2 is rotated together with the rotor body 2. The rotor shaft 1 is made of stainless steel as a nonmagnetic material, thereby preventing the magnetization of the permanent magnets 31a to 32d and the loss of magnetic flux.

The rotor body 2 includes the plurality of unit rotor bodies 21, 22, and 23 laminated on top of one another, and each of the unit rotor body has a plurality of plates 200 formed of a magnetic material laminated on top of one another. The unit rotor bodies 21, 22 and 23 can be assembled crossed by 180 degrees to the adjacent unit rotor body with respect to the rotor shaft 1, but they may be assembled in the same direction as the adjacent unit rotor body, which keeps the strength of the magnetic force.

As shown in FIG. 5, the nonmagnetic plate 60 is disposed at both ends of the rotor body 2, for preventing the loss of magnetic flux.

The rotor body 2 has a cooling hole 271 formed at both sides (that is, the both sides of a division groove 280) of the N-polar and S-polar permanent magnet groups 31 and 32 in such a manner as to be passed in the direction of the rotor shaft. The cooling hole 271 serves to enlarge the cooling area and to provide air flowing, such that the rotor body 2 and the permanent magnets 31 and 32 of the rotor 20 are all cooled. Of course, the nonmagnetic plate 60 that is disposed at both ends of the rotor body 2 has a cooling hole 61 formed at a position corresponding to the cooling hole 271 of the rotor body 2.

Each of the plurality of N-polar permanent magnet groups 31 has a plurality of permanent magnets 31a to 31d, and each of the plurality of S-polar permanent magnet groups 32 has a plurality of permanent magnets 32a to 32d. The plurality of N-polar and S-polar permanent magnet groups 31 and 32 are arranged radially along the outside of the center portion of the rotor body in an alternating arrangement. That is, they are arranged along the circumferential direction of the rotor body 2, in such a manner that one N-polar permanent magnet group 21 faces the other N-polar permanent magnet group 31 and one S-polar permanent magnet group 32 faces the other S-polar permanent magnet group 32.

As shown in FIGS. 4 and 6, two sets of N-polar and S-polar permanent magnet groups 31 and 32 are provided. In this case, the N-poles of the permanent magnets 31a to 31d of the N-polar permanent magnet group 31 are disposed toward the outside of the rotor body 2 and the S-poles thereof are disposed toward the inside of the rotor body 2. On the other hand, the N-poles of the permanent magnets 32a to 32d of the S-polar permanent magnet group 32 are disposed toward the inside of the rotor body 2 and the S-poles thereof are disposed toward the outside of the rotor body 2.

Further, the permanent magnets 31a to 31d and 32a to 32d of the plurality of N-polar and S-polar permanent magnet groups 31 and 32 are spaced apart by a predetermined distance from the adjacent permanent magnet, and desirably, the permanent magnets 31b, 31c, 32b, and 32c arranged at the inner side in the groups have a magnetic force stronger than the permanent magnets 31a, 31d, 32a, and 32d arranged at the outer side of the groups. In other words, each of the N-polar and S-polar permanent magnet groups 31 and 32 has four permanent magnets wherein the two permanent magnets 31a, 31d, and 32a, 32d arranged at the outside in each group has one magnet, and the two permanent magnets 31b, 31c and 32b, 32c arranged at the inner side in each group has two magnets.

As shown in FIG. 6, the N-polar and S-polar permanent magnet groups 31 and 32 are completely divided in their space by means of the division groove 280, such that the lines of magnetic force generated from the N-polar permanent magnet groups 31 and entering the S-polar permanent magnet groups 32 are clearly formed divided from each other on the rotor body 2.

Further, the division groove 280 has a permanent magnet (which is not shown) coupled at the outside thereof, the permanent magnet having the N-pole and the S-pole disposed to form the lines of magnetic force in the radial direction of the rotor body 2.

The plurality of permanent magnets 33 are insertedly arranged between the N-polar and S-polar permanent magnet groups 31 and 32 along the inside of the rotor body 2, for increasing magnetic flux. Each of the plurality of permanent magnets 33 has a plurality of magnets and is disposed at the lines of magnetic force formed by the N-polar and S-polar permanent magnet groups 31 and 32 in such a manner that the N-pole of one end of the permanent magnet 33 faces the S-poles of the N-polar permanent magnet group 31 and the S-pole of the other end of the permanent magnet 33 faces the N-poles of the S-polar permanent magnet group 32.

Therefore, the lines of magnetic force generated from the N-polar permanent magnet groups 31 enter the S-polar permanent magnet groups 32, and those generated from the S-polar permanent magnet groups 32 enter the N-polar permanent magnet groups 31 again via the permanent magnets 33, thereby having a generally oval shape. Like this, the permanent magnets 33 are arranged on the lines of magnetic force passing through the inside of the rotor body 2, thereby inducing the lines of magnetic force in such a manner as to be clearly formed at the inside of the rotor body 2 as well as increasing the magnetic flux.

As shown in FIG. 6, the rotor body 2 has an elongated hole 220 formed passed along the direction of the rotor shaft. The elongated hole 220 is extended toward the center portion of the rotor body 2 from a position between each of the N-polar permanent magnet groups 31 and each of the S-polar permanent magnet groups 32. That is, when four permanent magnets 31a to 31d in each of the N-polar permanent magnet groups 31 and four permanent magnets 32a to 32d in each of the S-polar permanent magnet groups 32 are arranged spaced apart by a predetermined distance, the elongated hole 220 has a length extended from a position between the two inside permanent magnets 31b and 31c, and 32b and 32c to a position capable of covering the lines of magnetic force formed by the four permanent magnets 31a to 31d and 32a to 32d toward the center portion of the rotor body 2.

The elongated hole 220 prevents the lines of magnetic force formed by the permanent magnets 31a to 31d and 32a to 32d of the N-polar and S-polar permanent magnet groups 31 and 32 from being distorted and also prevents the lines of magnetic force formed by the two permanent magnets disposed at one side of the N-polar (or S-polar) permanent magnet group from entering the two permanent magnets disposed at the other side of the N-polar (or S-polar) permanent magnet group. This can be easily understood when the lines of magnetic force in FIG. 1 are compared with those in FIG. 7.

Figure 1:
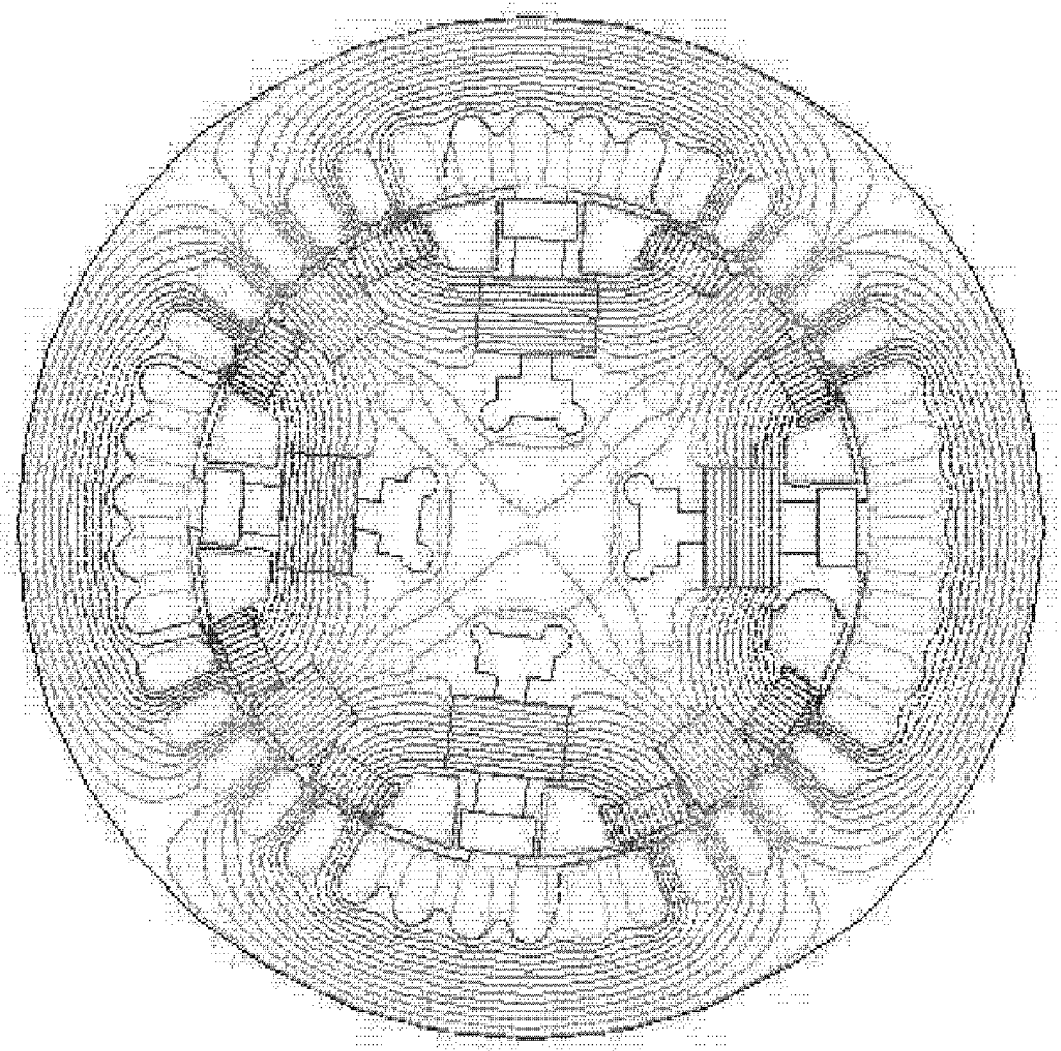
FIG. 1 is a view showing the lines of magnetic force generated from permanent magnets according to the conventional practice.

In other words, the lines of magnetic force in FIG. 1 according to the conventional practice are much distorted in the rotor body, and the adjacent two lines of magnetic force are not clearly divided from each other.

Since the loss of magnetic flux is greatly reduced, however, the lines of magnetic force in FIG. 7 according to the present invention are smoothly curved and little distorted, and the adjacent two lines of magnetic force are clearly divided from each other by the formation of the elongated hole 220.

As shown in FIG. 6, a nonmagnetic rod 40 is insertedly coupled between the plurality of permanent magnets of each of the N-polar and S-polar permanent magnet groups 31 and 32. In the preferred embodiment of the present invention, the nonmagnetic rod 40 is formed of a copper rod. The nonmagnetic rod 40 reduces Histeresis loss to make the frequency waveforms smooth. That is, the nonmagnetic rod 40 serves to remove the harmonics of the frequency waveforms to make the output waveforms smooth, which enables the vibration and noise of the generator to be substantially reduced.

It can be appreciated that the differences of effects according to the existence/nonexistence of the nonmagnetic rod 40 are made through the following experiment results.

<Experiment Results>

In this experiment, the voltage of 380 V in three-phase/Y-connection type is supplied to the stator 10, the rotor 20 has a diameter of 220 mm, and the air gap between the stator 10 and the rotor 20 has a length of 0.7 mm. Under these conditions, the experiment result values between the existence of the copper rod (the nonmagnetic rod 40) and the nonexistence of the copper rod are as follows:

First harmonics: 371.23/453.90 [V]
Third harmonics: 1.62/4.80 [V]
Fifth harmonics: 6.45/5.75 [V]
Seventh harmonics: 0.4/1 4.80 [V]
Ninth harmonics: 0.19/0.42 [V]
Eleventh harmonics: 2.20/3.74 [V]
Thirteenth harmonics: 1.37/0.53 [V]
Synthetic harmonics (THD-R): 1.96/5.51 [%], wherein the left side voltage sizes are obtained when the copper rod is formed, and the right side voltage sizes are obtained when the copper rod is not formed.

Further, a guide rod 50 is provided to assemble the rotor body 2 or the unit rotor bodies 21, 22 and 23 with one another. As the plates 200 are inserted one by one around the guide rod 50, the unit rotor bodies 21, 22 and 23 can be easily assembled. Of course, the guide rod 50 is extended to assemble the unit rotor bodies 21, 22 and 23 together all, thereby forming the rotor body 2. So as to insert the guide rod 50 into the plate, one of the plurality of cooling holes 271 has a different shape, thereby preventing the plates 200 from being laminated turned over or rotated by a predetermined angle.

As shown in FIG. 5, the plate 200 has a shaft-hole 210 formed at the center portion thereof, a plurality of magnet-holes 231a to 231d and 232a to 232d for inserting the plurality of permanent magnets of the N-polar and S-polar permanent magnet groups 31 and 32 along the circumferential direction thereof, and a cooling hole 271 formed at both sides of the magnet-holes.

Furthermore, the division grooves 280 are formed radially along the outer circumference of each plate to allow each of the N-polar permanent magnet groups 31 to be spatially separated from each of the S-polar permanent magnet groups 32, and each of the division grooves 280 has a magnet-coupling portion 233 formed at the inside thereof, for insertedly coupling the magnetic flux-increasing permanent magnet 33 thereto.

A copper rod-hole 240 is formed between the plurality of magnet-holes 231a to 231d and 232a to 232d of the N-polar and S-polar permanent magnet groups 31 and 32, for insertedly coupling the nonmagnetic rod 40 thereto, and a plurality of screw holes 290 are formed along the inside of the plate 200, for screw-coupling the plurality of plates 200 laminated on top of one another thereto.

According to the present invention, as shown in FIG. 8, the stator 10 has a plurality of unit stator bodies (hereinafter, referred to as core plates) laminated on top of one another, each of the core plates having a rotor-receiving portion 10a formed at the center portion thereof and being separable into a plurality of semicircular-shaped pieces 11 and 11'.

The stator 10 has a cylindrical shape as the plurality of core plates are laminated, and thus, the cylindrical stator 10 has the rotor-receiving portion 10a at the inside thereof.

As shown in FIG. 9, the rotor 20 is rotatably inserted into the rotor-receiving portion 10a of the stator 10.

Each of the core plate has a plurality of semicircular-shaped pieces 11 and 11' formed separated from each other, and when the two pieces are coupled to each other, the ring-shaped core plate is formed.

Each of the core plates are manufactured at the state of being separated into the two pieces 11 and 11', and the separated two pieces of the core plate are semicircular-shaped.

Each of the semicircular-shaped two pieces of the core plate has a coupling protrusion 11a and a coupling groove 11b formed at both ends thereof.

In the preferred embodiment of the present invention, the coupling protrusion 11a is formed protruded in a semicircular shape, and the coupling groove 11b is formed indented in a semicircular shape. In this case, only if the coupling protrusion 11a and the coupling groove 11b have the same shape as each other in such a manner as to correspond with each other, they may have different shapes.

The coupling protrusion 11a formed at one semicircular-shaped core plate piece 11 is insertedly coupled into the coupling groove 11b formed at the other semicircular-shaped core plate piece 11'. As a result, this prevents the pair of semicircular-shaped core plate pieces 11 and 11' from being slid from the separated front ends thereof.

More particularly, when compared with the ring-shaped plate, the semicircular-shaped core plate pieces 11 and 11' are likely to be opened or deformed at both ends thereof by the moment applied to the both ends thereof. Thus, the coupling protrusion 11a and the coupling groove 11b serve as a stopper.

The separated front ends of the core plate piece 11 are coupled with those of the other core plate piece 11' by means of welding.

The pair of core plate pieces 11 and 11' have a plurality of locking projections 12 extended outwardly along the outer peripheries thereof. The locking projections 12 each have a square-like shape and are formed along the outer peripheral surfaces of the core plate pieces 11 and 11' at predetermined intervals.

FIG. 10 is a perspective view showing the assembled state of the stator in the rotary device of the present invention.

As shown in FIG. 10, in a case where the plural pairs of core plate pieces 11 and 11' are laminated to assemble the stator 10, a plurality of assembling guide members 15 are supportedly mounted at one sides of the plurality of locking projections 12, thereby preventing the plural pairs of core plate pieces 11 and 11' from being assembled misaligned to one another.

Each of the assembling guide members 15 is formed of a square rod and tightly abuts at one side of the locking projection 12, such that the plural pairs of core plate pieces 11 and 11' can be assembled aligned completely to one another.

The assembling guide member 15 and the locking projection 12 are coupled with each other by means of welding.

The plural pairs of core plate pieces 11 and 11' each have a plurality of wire-winding portions 13 formed continuously along the inner walls at predetermined intervals.

FIG. 11 is a plane view showing the manufacturing state of the core plates of FIG. 9.

As shown in FIG. 11, the separated core plate piece 11 can be formed substantially near the adjacent separated core plate piece 11', upon the cutting, thereby reducing an amount of consumed materials.

Especially, when compared with the ring-shaped core plate, the separated core plate piece 11 can be manufactured having the other separated core plate piece 11' inserted into the semicircular-shaped inside thereof, thereby greatly reducing the amount of the material consumption.

On the other hand, the separated core plate pieces 11 and 11' have relatively small volume, thereby making it easy to keep them at a given place. Further, when the core plate pieces 11 and 11' are assembled after manufactured separately, it is found that the generation of harmonics is greatly decreased.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

As set forth in the foregoing, according to the preferred embodiment of the present invention, there is provided a rotary device of a generator or motor that is capable of increasing the magnetic flux and preventing the loss of the magnetic flux, thereby enhancing the generation efficiency of the generator or motor.

Additionally, the rotary device of this invention provides screw to a stator to achieve the assembling with a rotor easily and to remove harmonics, and removes the harmonics once again by the formation of nonmagnetic rods, thereby making the frequency waveforms smooth and reducing the noise and vibration of the generator or motor.

Further, the rotary device of this invention has the stator having a plurality of pieces separately assembled to each other, thereby reducing the material costs and suppressing the generation of harmonics.

Moreover, the rotary device of this invention prevents the distortion of the lines of magnetic force formed by the permanent magnets, thereby obtaining a high efficiency of the generator or motor.

What is claimed is:

1. A rotary device of a generator or motor comprising:
   a stator having a hollow portion formed at the inside thereof and a plurality of slots formed to wind coils therearound, each of the plurality of slots being skewed at a predetermined angle;
   a rotor shaft formed of a nonmagnetic material;
   a cylindrical rotor body adapted to axially rotate together with the rotor shaft;
   a plurality of N-polar and S-polar permanent magnet groups insertedly coupled radially along the outside of the center portion of the rotor body in an alternating arrangement;
   a plurality of permanent magnets insertedly coupled along the inside of the rotor body and arranged on the lines of magnetic force formed by the N-polar and S-polar permanent magnet groups, for increasing magnetic flux; and
   a rotor adapted to be rotatably inserted into the hollow portion of the stator,
   wherein the rotor body has an elongated hole extended toward the center portion of the rotor body from a position between each of the N-polar permanent magnet groups and each of the S-polar permanent magnet groups, for preventing the lines of magnetic force generated by the plurality of N-polar and S-polar permanent magnet groups from being distorted, and for preventing the lines of magnetic force formed by the two permanent magnets disposed at one side of the N-polar (or S-polar) permanent magnet group from entering the two permanent magnets disposed at the other side of the N-polar (or S-polar) permanent magnet group,
   wherein the permanent magnets arranged at the inner side in the plurality of N-polar and S-polar permanent magnet groups have a magnetic force stronger than the permanent magnets arranged at the outer side of the plurality of N-polar and S-polar permanent magnet groups,
   wherein each of the elongated holes extends radially and is disposed between the center of the rotor body and a corresponding permanent magnet group, and
   wherein each of the elongated holes has a shape of radially oblong slit having an azimuthal width substantially narrower than a radial length for preventing the lines of magnetic force generated from being distorted around the elongated holes, and for preventing the lines of magnetic force formed by the two permanent magnets disposed at one side of the N-polar (or S-polar) permanent magnet group from entering the two permanent magnets disposed at the other side of the N-polar (or S-polar) permanent magnet group.

2. A rotary device of a generator or motor according to claim 1, wherein each of the N-polar and S-polar permanent magnet groups of the rotor body comprises a plurality of permanent magnets formed spaced apart from each other by predetermined intervals. and a nonmagnetic rod is insertedly coupled between the permanent magnets of each of the N-polar and S-polar permanent magnet groups.

3. A rotary device of a generator or motor according to claim 1, wherein the rotor body has a nonmagnetic plate disposed at both ends thereof.

4. A rotary device of a generator or motor according to claim 1, wherein the rotor body has a plurality of plates laminated on top of one another, and each of the plurality of plates has division grooves formed along the outer circumference thereof to allow each of the N-polar permanent magnet groups to be spatially separated from each of the S-polar permanent magnet groups. the division groove having a cooling hole formed at both sides thereof for cooling the permanent magnets in the N-polar and S-polar permanent magnet groups and the permanent magnets for increasing the magnetic flux being insertedly coupled at the inside of the division groove.

5. A rotary device of a generator or motor according to claim 1, wherein the stator comprises: a plurality of core plates laminated on top of one another, each of the core plates having a rotor-receiving portion formed at the center portion thereof and a plurality of arc-shaped core plate pieces separable from each other; a coupling protrusion and a coupling groove formed on the separated front ends of each of the core plate pieces; and at least one or more locking projections extended outwardly around the outer periphery of each of the core plates.

* * * * *